United States Patent [19]

Anderson

[11] 4,131,873
[45] Dec. 26, 1978

[54] SLANT RANGE AND DIRECTION DETECTOR

[75] Inventor: William B. Anderson, Silverdale, Wash.

[73] Assignee: The United States of America as represented by the Secretary of the Navy, Washington, D.C.

[21] Appl. No.: 764,483

[22] Filed: Jan. 31, 1977

[51] Int. Cl.$^2$ .............................................. G01S 3/80
[52] U.S. Cl. ..................................................... 340/6 R
[58] Field of Search .................... 340/6 R, 16 R, 16 P

[56] References Cited

U.S. PATENT DOCUMENTS

| | | | |
|---|---|---|---|
| 2,721,315 | 10/1955 | Snyder | 340/6 R |
| 3,205,475 | 9/1965 | Foss | 340/6 R |
| 3,296,581 | 1/1967 | Warner | 340/16 P |
| 3,475,721 | 10/1969 | Cappel, Jr. et al. | 340/6 R |
| 3,731,273 | 5/1973 | Hunt | 340/16 R |

OTHER PUBLICATIONS

Saltzer, *Proceedings of the Ion National Marine Navigation Symposium on Manned Deep Submergence Vehicles*, Nov. 1969, pp. 219–229.
Hulford, *Ultrasonics*, Jan. 1969, pp. 47–50.

*Primary Examiner*—Richard A. Farley
*Attorney, Agent, or Firm*—R. S. Sciascia; Charles D. B. Curry

[57] ABSTRACT

A slant range and direction detector that is particularly useful for tracking underwater target vehicles. The device is capable of very quickly measuring the slant range and indicating the relative bearing from the sound signal emitted by the pinger mounted on a target vehicle. The device is completely portable and can be readily operated by one person. It can be operated over a wide range of acoustic frequencies, for example, 1 Hz to 100 meg Hz. However, it is preferably operated in the 1 KHz to 100 KHz spectrum. The detector uses a plurality of gates, clocks, timers, counters and the like to indicate relative bearing by a three light display system and distance by a counter display. The portable hydrophone sensors are spaced apart a fixed distance and may be operated in either the broadside or endfire modes.

8 Claims, 3 Drawing Figures

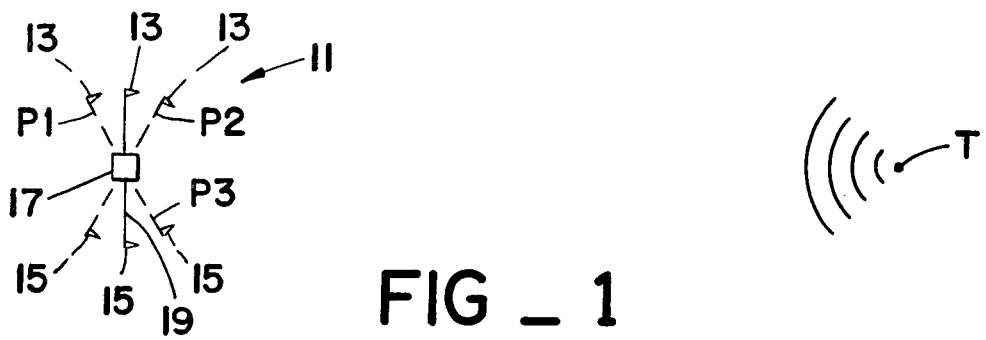
FIG _ 1
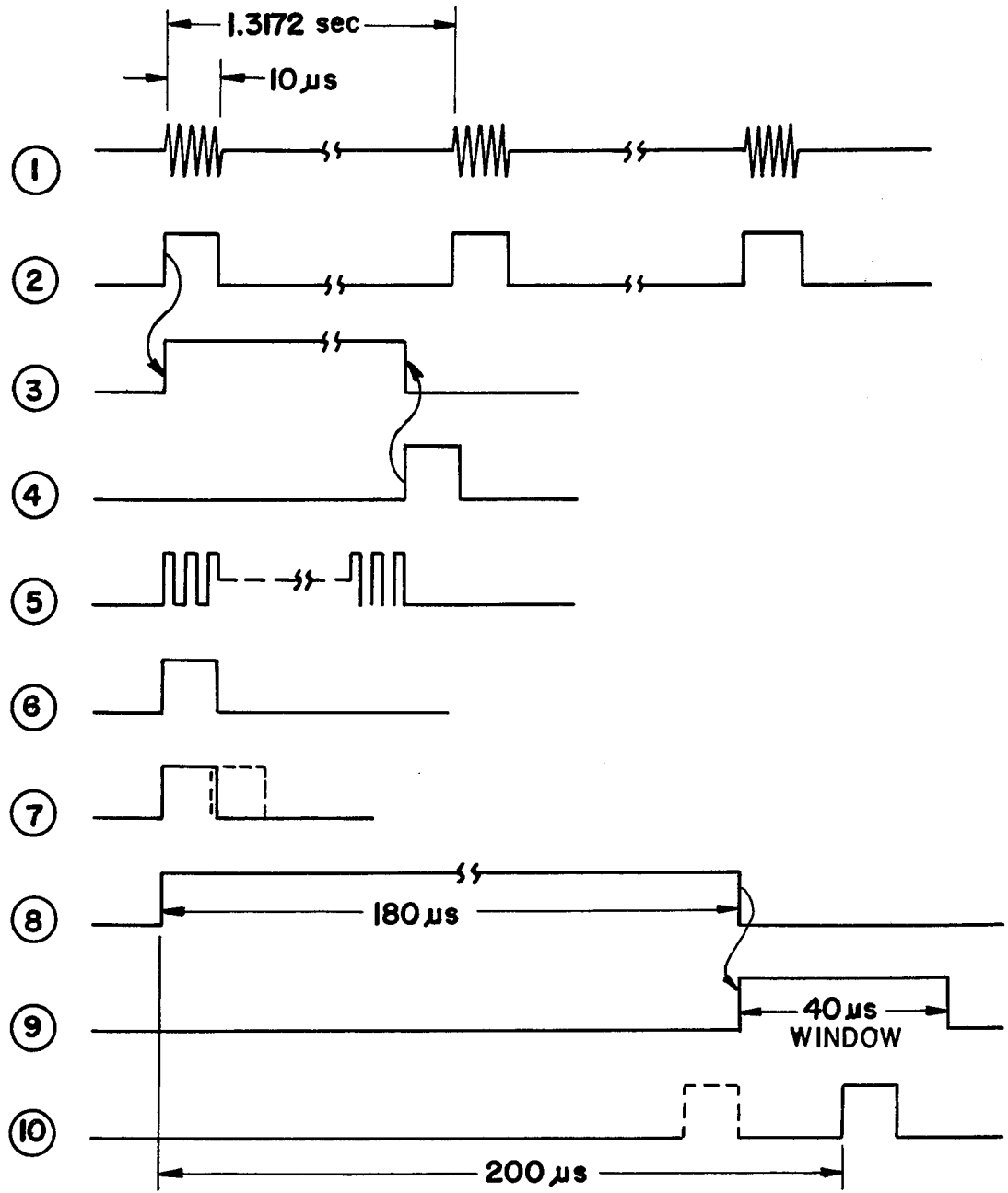
FIG _ 3

SLANT RANGE AND DIRECTION DETECTOR

BACKGROUND OF THE INVENTION

1. Field of the Invention

The present invention relates to a range and direction detector and more particularly to a slant range and direction detector that is portable and may be used to locate underwater vehicles.

2. Description of the Prior Art

It is frequently necessary to operate underwater vehicles in regions where an acoustic tracking range does not exist. In such cases it has been previously necessary to await the surfacing of the vehicle before its performance could be evaluated. If the unit failed to surface a considerable investment in time and money was lost. One of the main problems in recovery operations was the unavailability of portable units that could be readily carried by operating personnel.

These problems have been overcome by the present invention by providing a portable and highly effective range and direction detector that may be carried by undersea divers. The unit may be also held over the side of a support boat to track the underwater vehicle from launch point to end of run.

SUMMARY OF THE INVENTION

Briefly, the present invention comprises a slant range and direction detector that is particularly useful for tracking underwater target vehicles. The device is capable of very quickly measuring the slant range and indicating the relative bearing from the sound signal emitted by the pinger mounted on a target vehicle. The device is completely portable and can be readily operated by one person. It can be operated over a wide range of acoustic frequencies, for example, 1 Hz to 100 meg Hz. However, it is preferably operated in the 1 KHz spectrum. The detector uses a plurality of gates, clocks, timers, counters and the like to indicate relative bearing by a three light display system and distance by a counter display. The portable hydrophone sensors are spaced apart a fixed distance and may be operated in either the broadside or endfire modes.

STATEMENT OF THE OBJECTS OF THE INVENTION

An object of the present invention is to provide a device that is effective for determining the range and direction of an underwater object.

Another object of the present invention is to provide a portable and highly effective underwater range and direction finder.

Still another object of the present invention is to provide a range and direction finder that may be used from the surface or carried below the surface of the water by a diver who is attempting to locate an object that is emitting sound from a pinger.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic illustration of the general use and operation of the range and direction detector of the present invention;

FIG. 3 is a timing and signal diagram illustrating the operation of the direction detector shown in FIG. 2.

DESCRIPTION OF THE PREFERRED EMBODIMENT

Figure 2:
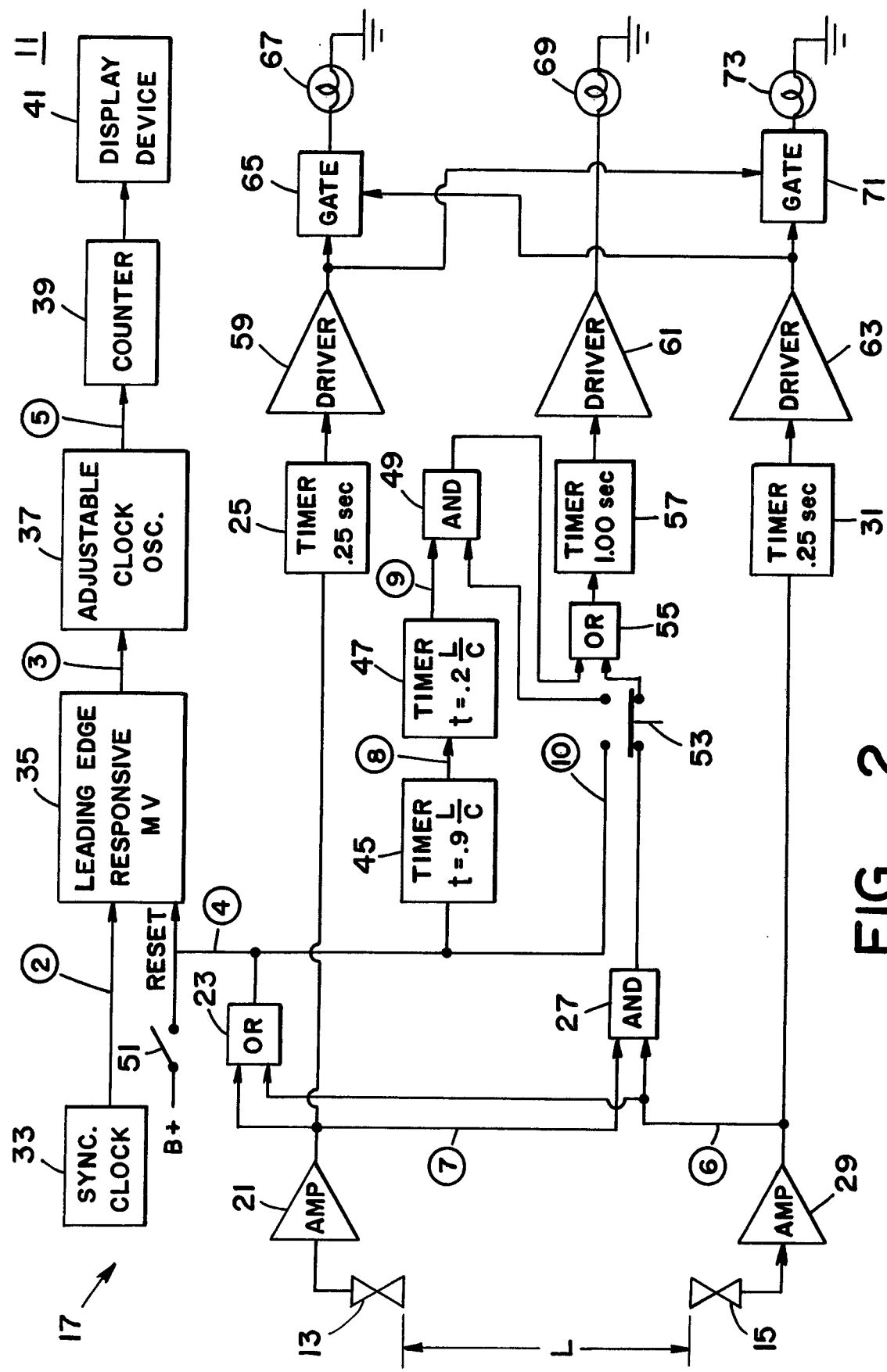
FIG. 2 is a block diagram of the range and direction detector generally shown in FIG. 1.

In FIG. 1 is schematically illustrated the general use and operation of the range and direction detector 11 of the present invention. The range and direction finder 11 includes hydrophone receivers 13 and 15 and the electronic control system generally identified by reference numeral 17 in FIGS. 1 and 2. The hydrophones are spaced apart a predetermined length L by a mechanical structure 19. The signals from the hydrophones are received and processed by the electronic control system 17 as hereinafter described in detail. As illustrated in FIG. 1 a target T will transmit an acoustic signal by means of a pinger which will be received by the range and direction detector 11. The range and direction detector 11 is designed to be portable and will define the target range and relative direction from the detector. Being portable the detector 11 may be readily moved from position P1, to position P2, to position P3. The electronic control system 17 will tell the operator, by indicator lights, whether the hydrophone support structure is clockwise or counterclockwise or is directed towards the target T. The detector 11 will also tell the operator, by visual display, the distance to the lost object. The detector 11 is preferably made portable and light weight so that it may be carried by undersea divers who may be looking for a lost object that is emitting an acoustic signal or ping. The detector 11 also may be ship borne wherein the electronic control system 17 is on board ship and the hydrophones 13 and 15 and their support structure 19 are separate and may be emersed in the water.

In FIG. 2 is illustrated a schematic diagram of the range and direction detector 11 of the present invention. The detector 11 includes a pair of hydrophone receivers 13 and 15 that are structurally interconnected and spaced apart a distance L. The output of hydrophone 13 is connected to the input of amplifier 21 the output of which is connected to the inputs of OR gate 23, timer 25 and AND gate 27. The output of hydrophone 15 is connected to the input of amplifier 29 the output of which is connected to timer 31, AND gate 27 and OR gate 23. A synchronous clock 33 provides an output signal that is synchronous with the signal being emitted by the pinger on the lost object. This synchronism is achieved by techniques well known to those skilled in the art. The signal being emitted by the target T of FIG. 1 is illustrated as curve 1 in FIG. 3 and the signal 2 being generated by synchronous clock 33 is illustrated as curve 2 of FIG. 3. The output of synchronous clock 33 is applied to the input of leading edge responsive multivibrator 35 the output signal 3 of which is applied to the input of adjustable clock oscillator 37 the output signal 5 of which is applied to the input of counter 39 the output of which is displayed by display device 41.

The output of OR gate 23 is connected to the reset input of multivibrator 35, to the input of timer 45 and through selector switch 53 to one input of AND gate 49 when the selector switch is in the upper position. The output of timer 45 is connected to the input of timer 47 the output of which is connected to the other input of AND gate 49. The B+ power is connected through manual switch 51 to the reset input of multivibrator 35.

The output of AND gate 27 is connected through selector switch 53 to one input of OR gate 55 when the selector switch is in the lower position as shown. The output of AND gate 49 is connected to the other input of OR gate 55 the output of which is connected to the input of timer 57.

The outputs of timers 25, 57, and 31 are respectively connected to the inputs of lamp drivers 59, 61 and 63. The output of driver 59 is connected through GATE 65 to lamp 67. The output of driver 61 is connected directly to lamp 69. The output of driver 63 is connected through gate 71 to lamp 73. The output of driver 59 is also connected to the gate input of gate 71 and the output of driver 63 is also connected to the gate input of gate 65.

OPERATION

In FIG. 3 the output of the synchronous clock 33 of FIG. 2 is illustrated by signal 2. Synchronous clock signal 2 is a square wave signal that corresponds to the 10 $\mu s$, for example, tone burst signal 1 emitted from the pinger on the target T. The vehicle pinger signal 1 is either received first by hydrophone 13 and then hydrophone 15, or first by hydrophone 15 and then hydrophone 13 or simultaneously by hydrophones 13 and 15. Operation is initiated by closing switch 51 that resets multivibrator 35. Therefore, the leading edge of the next pulse from synchronous clock signal 2 will turn on multivibrator 35 and initiate signal 3 as illustrated by the curved line in FIG. 3. Signal 3 will continue until the next reset pulse is received by multivibrator 35. This next reset pulse will occur upon receipt of a signal by either or both of hydrophones 13 and 15. This is indicated by signal 4 of FIGS. 2 and 3 wherein the leading edge of signal 4, the output of OR gate 23, will reset multivibrator 35 and terminate signal 3 as illustrated by the curved line.

Oscillator clock 37 is made adjustable and is adjusted to have a frequency of operation that corresponds with the speed of sound in feet per second in the local sea water where measurements are being made. Normally the speed of sound in sea water will vary between 4600 and 5200 feet per second. Therefore, adjustable clock oscillator 37 is selected to have an adjustable frequency range of at least 4600 to 5200 Hz. Therefore, if the speed of sound in the region where the tests are being taken is 5,000 feet per second, for example, the oscillator is selected to have a frequency of 5000 Hz. From the foregoing it can be seen that signal 3 will start when the leading edge of the pinger pulse 1 occurs (since the leading edge of pulse 2 is synchronized with the leading edge of pulse 1) and will terminate when the leading edge of the pinger pulse first reaches either or both of hydrophones 13 and 15. Therefore, the duration of signal 3 represents the transit time of the pinger pulse from target T to the detector 11. Since the frequency of operation of clock 37 is selected to be the same as the speed of sound in the measured sea water the number of pulses, as indicated by signal 5 of FIGS. 2 and 3, from clock 37 will provide a direct indication of slant range in feet. The output of clock 37 is counted by counter 39 which is displayed on display device 41 which shows the operator the slant distance of the target T from the detector 11.

At the outset assume that hydrophones 13 and 15 are in position P2, of FIG. 1. In this situation hydrophone receiver 13 will receive the signal first and turn on 0.25 second timer 25 which will simultaneously turn on lamp driver 59 and lamp 67. It should be noted that the signal from driver 59 will turn off gate 71 and therefore prevent lamp 73 from being turned on when hydrophone receiver 15 later receives the signal from target T. Therefore, the operator will know the target T is counter clockwise, lamp 67 being on for 0.25 seconds, and will rotate the hydrophone receiver counter clockwise. The normal "zeroing in" procedure will result in the operator turning the hydrophone a sufficient amount counter clockwise so that the target T is then clockwise from the broadside position. In this situation hydrophone receiver 15 will receive the pinger signal from the target T first and will turn on light 73 for a period of 0.25 seconds and simultaneously prevent the signal from being received by light 67 by turning off gate 65. Then the operator will continue the zeroing in procedure until both signals from hydrophones 13 and 15 turn on AND gate 27. This condition is achieved when the signal 7 received by hydrophone 13 is at least partially coincident with signal 6 received by hydrophone 15. This will result in turning on 1 second timer 57 which will turn on the center light 69 for a period of 1 second. Therefore, the operator will know, by time duration and the central position of light 69, that the perpendicular axis intersecting the axis between the hydrophones points in the direction of the target T.

From this it can be seen that a very effective distance and direction detector is provided wherein the distance is indicated in feet on device 41 and the direction is indicated by the bank of preferably equally spaced and longitudinally aligned display lights 67, 69 and 71.

The above described operation is used when the target is relatively near, for example 2000 feet, and the broadside mode of detection is suitable. However, when the target T is at a distance of more than 2000 feet it is frequently preferable to use the end fire mode of detection. This is achieved by positioning selector switch 53 in the upper position. Assume that hydrophone 13 receives the signal first. In this situation the output of OR gate 23 will turn on timer 45 which will have a pulse time duration of $t = 0.9 \, L/C$ or ($t = 0.9 \times 1/5000 = 180 \, \mu sec$) where $L = 1$ foot and $C = 5000$ feet per second. This is illustrated as signal 8 in FIGS. 2 and 3. Timer 47 is responsive to the trailing edge of signal 8 from timer 45 and will remain on for 40 $\mu sec$ ($t = 0.2 \times 1/5000 = 40 \, \mu sec$) as shown by signal 9 of FIGS. 2 and 3. The maximum time delay for receiver 15 to receive the same pinger signal is 200 $\mu s$ ($t = 1/5000 = 200 \, \mu s$) and that occurs when the axis of hydrophones 13 and 15 point directly at the target T and the hydrophones are spaced 1 foot apart. From the foregoing and by comparing signals 9 and 10 it can be seen that a 40 $\mu s$ window is provided. Therefore, when the pulse from target T is received within the 40 $\mu s$ window period light 69 will turn on for 1 second. From this it can be seen that end fire operation will result in the axis passing through hydrophones 13 and 15 pointing toward the target T. The off angle deviation from the exact pointing is determined by the window time as determined by the time constants of timers 45 and 47. It should be noted that light 67 will turn on when hydrophone 13 is closer or generally pointing toward the target and that light 73 will turn on when hydrophone 15 is closer or generally pointing toward the target. This will therefore provide the required 180° orientation of the detector.

It will be obvious to one skilled in the art that the various time durations and frequencies of the previously described signals may be modified in accordance with particular needs provided these modifications are compatible with the basic teachings the present invention.

What is claimed is:

1. A range and direction detector for determining the range and direction of an underwater object emitting an acoustic signal having a predetermined repetition frequency comprising:
   (a) first and second hydrophone receivers;
   (b) a synchronous clock for providing an output signal that is synchronized with said acoustic signal;
   (c) an OR gate and an AND gate;
   (d) the output of said first hydrophone connected to one input of said AND gate and to one input of said OR gate, the output of said second hydrophone connected to the other input of said AND gate and to the other input of said OR gate;
   (e) a range detection means;
   (f) a direction detection means including an end fire detection means and a broadside detection means;
   (g) the output of said OR gate being connected to a reset input of said range detection means to initiate the range detection means and to the input of said end fire detection means;
   (h) the output of said AND gate being connected to said broadfire detection means.

2. The device of claim 1 wherein:
   (a) said end fire detection means includes a first timer the output of which is connected to a second timer the output of which is connected to a second AND gate, the output of said OR gate being connected to the input of said first timer and to the other input of said second AND gate.

3. The device of claim 1 wherein:
   (a) said broadside detection means includes a second OR gate the output of which is connected through a first timer to a first light;
   (b) the output of said first hydrophone being connected to a second timer the output of which is connected to a first gate the output of which is connected to a second light;
   (c) the output of said second hydrophone being connected to a third timer the output of which is connected to a second gate the output of which is connected to a third light; and
   (d) the output of said third timer being connected to the gate input of said first gate and the output of said second timer being connected to the gate input of said second gate.

4. A direction detector comprising:
   (a) a first hydrophone and a second hydrophone;
   (b) the output of said first hydrophone being connected to the input of a first gate the output of which is connected to a first light;
   (c) the output of said second hydrophone being connected to the input of a second gate the output of which is connected to a second light;
   (d) the output of said second hydrophone connected to the gate input of said first gate and the output of said first hydrophone connected to the gate input of said second gate;
   (e) an AND gate;
   (f) the output of said first hydrophone connected to one input of said AND gate and the output of said second hydrophone connected to the other input of said AND gate;
   (g) the output of said AND gate operably connected to the input of a third light;
   (h) a first timer the output of which is connected to the input of a second timer the output of which is connected to a second AND gate the output of which is connected to said third light;
   (i) an OR gate; and
   (j) the output of said first hydrophone being connected to one input of said OR gate and the output of said second hydrophone connected to the other input of said OR gate, the output of said OR gate being connected to the input of said first timer and to the other output of said second AND gate.

5. A range and direction detector for determining the range and direction of an underwater object emitting an acoustic signal having a predetermined repetition frequency comprising:
   (a) first and second hydrophone receivers;
   (b) a synchronous clock for providing an output signal that is synchronized with said acoustic signal;
   (c) a range detection means responsive to the output of said synchronous clock and to the output of at least one of said first and second hydrophone receivers for determining the range of said detector from said object;
   (d) a direction detection means responsive to the outputs of both of said first and second hydrophone receivers for determining the relative position of said detector from said object;
   (e) said hydrophones being rigidly mounted on a support structure a predetermined distance apart wherein said support structure and first and second hydrophones are readily movable;
   (f) a leading edge responsive multivibrator the output of which is connected to the input of an adjustable clock oscillator, the output of which is connected to the input of a counter, the output of which is connected to the input of a display device;
   (g) said multivibrator initiates an electrical pulse having a leading edge generated by reception of said output signal from said synchronous clock and having a trailing edge generated by reception of the aforesaid acoustic signal from either or both of the aforesaid hydrophone receivers;
   (h) said adjustable clock oscillator generates a pulse wave train beginning with said leading edge and terminating with said trailing edge of said electrical pulse initiated by said multivibrator; and
   (i) the frequency of said adjustable clock being selected to be the same as the speed of sound in feet per second of the water in which the object is located.

6. The detector of claim 5 wherein:
   (a) said direction detection means includes first, second, and third lights, and first light operating means for turning on said first light when a signal is received by said first hydrophone before the same signal is received by said second hydrophone, for turning on said third light when a signal is received by said second hydrophone before the same signal is received by said first hydrophone, and for turning on said second light when a signal is simultaneously received by said first and second hydrophones.

7. The detector of claim 5 wherein:
   (a) said direction detector means includes first, second and third lights, and light operating means for turning on said first light when a signal is received by said first hydrophone before the same signal is received by second hydrophone, for turning on said third light when a signal is received by said second hydrophone before the same signal is received by said first hydrophone and for turning on said second light when a signal is received by said second hydrophone a predetermined time after the same signal was received by said first hydrophone.

8. The detector of claim 7 wherein:
   (a) said predetermined time is about equal to the time for said signal to travel said predetermined distance between said first and second hydrophones.